Feb. 23, 1971  U. SCHMIDT  3,565,510

DIGITAL OPTICAL FOCAL LENGTH MODULATOR

Filed April 7, 1969

*INVENTOR.*
UWE SCHMIDT
BY
AGENT

United States Patent Office 3,565,510
Patented Feb. 23, 1971

3,565,510
DIGITAL OPTICAL FOCAL LENGTH MODULATOR
Uwe Schmidt, Pinneberg, Germany, assignor to U.S. Philips Corporation, New York, N.Y., a corporation of Delaware
Filed Apr. 7, 1969, Ser. No. 813,940
Claims priority, application Germany, Apr. 6, 1968, P 17 64 133.7
Int. Cl. G02b 1/08; G02f 1/24
U.S. Cl. 350—175                                         5 Claims

ABSTRACT OF THE DISCLOSURE

A digital focal length modulator assembly where a number of electro-optically controlled aligned stages, digitally control the focal length of the assembly. In each stage of the assembly an electro-optically controlled polarizer digitally alters the effective focal length of a pair of birefringent lenses. The effective curvature of the lenses progessively increases along the assembly.

---

The invention relates to a digtal focal length modulator having a plurality of stages which are arranged one behind the other and each comprise a controllable electro-optical polarizer and a birefringent lens.

Since a modulator is known, see e.g. U. J. Schmidt, "The Problem of Light Beam Deflection at High Frequencies" in "Optical Processing of Information," pp. 98–103, Spartan Books, Baltimore, 1963. In the known modulator a light beam is caused to pass through a sequence of electro-optical polarizers alternating with birefringent lenses. By applying suitable electric voltages to the polarizer, with suitable orientation of the optic axes of the birefringent lenses the angular aperture of the light beam can be changed in digital steps. In this method, the variation of the focal length as such is solely determined by the geometry of the birefringent lenses and by the values of the refractive indices of the birefringent material and of the refractive index of the surrounding medium. The code of the voltages to be applied to the polarizers is binary.

The change of the focal lengths takes place in discrete steps. If the focal lengths of the birefringent lenses of the individual modulator stages are chosen so as to increase from stage to stage by a factor of 2 and if the thin-lens laws apply to these lenses, each available focus is spaced from the adjacent foci by the same distances.

The condition that the birefringent elements are thin lenses is not always satisfied, because the requirement that the focal lengths form a geometrical progression may readily lead to very small focal lengths i.e. to large aperture ratios. In this case, there is no longer any certainty that the said equality of spacings between the foci is actually obtained.

It is an object of the invention to reduce the differences of the spacings between the foci. For this purpose, the invention is characterized in that in each stage at least two birefringent lenses are arranged one behind the other, the optic axes of the two lenses being normal to one another and to the normal principal planes of the two lenses whilst the facing surfaces have opposite curvatures.

Figure 1:
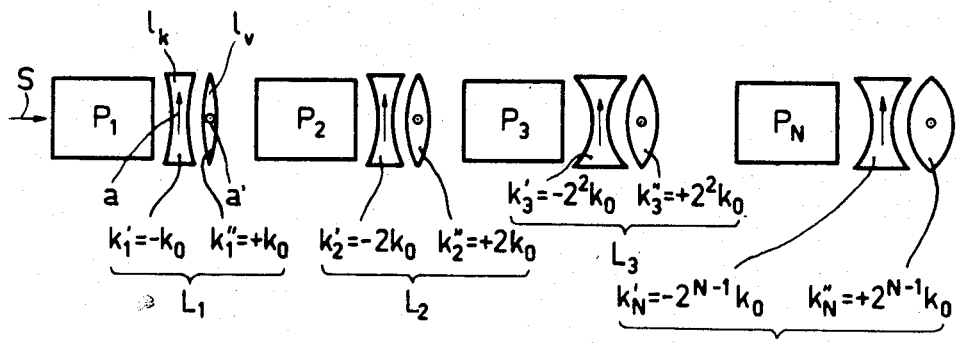
Figure 2:
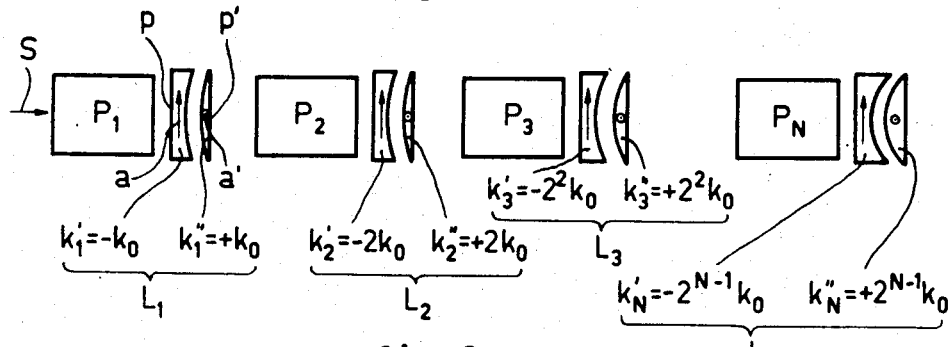
Figure 3:
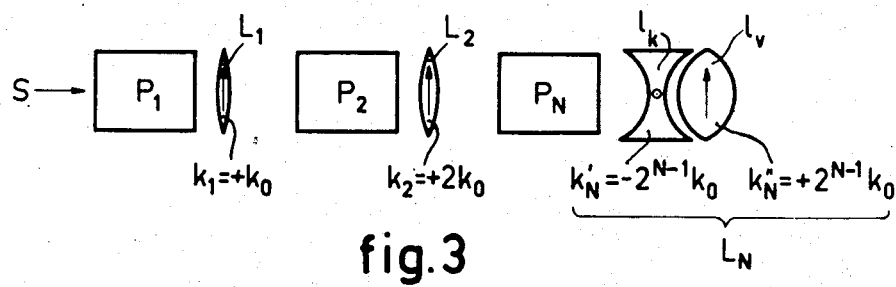
Figure 4:
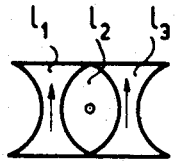

Features and advantages of the invention will appear from the following description of embodiments thereof, given by way of example only, with reference to the accompanying drawings, in which:

FIGS. 1, 2 and 3 show schematically embodiments of a modulator according to the invention, and FIG. 4 shows schematically a lens for use in an embodiment.

Referring to FIG. 1, there is shown schematically the structure of a digital focal length modulator. The digital focal length modulator comprises a sequence of N polarizers $P_1 \ldots P_N$ alternating with N birefringent lens combinations $L_1 \ldots L_N$ which each comprise a concave lens $L_k$ and a convex lens $L_v$. In the embodiment described the value of the effective curvatures $k'_1 \ldots k'_N$ and $k''_1 \ldots k''_N$ of the individual lenses increases by a factor of two in the direction of propagation of a light beam S passing through the focal length modulator. The term "effective curvature" is to be understood to mean the reciprocal of the sum of the radii of curvature of the active lens surfaces, the sign of the curvature being used in the usual manner. As has been mentioned hereinbefore, each stage of the modulator includes a concave lens $l_k \ldots$ and a convex lens $l_v \ldots$ made of a uniaxial birefringent material. The optic axes $a$ and $a'$ of the two lenses are normal to one another and to the normal to the principal plane. In addition, in modulators which exhibit the transverse electro-optic effect the two optic axes make an angle of 45° with the direction of the electric field to be applied to the electric-optic modulator. This orientation of the electro-optic modulator ensures that a light beam which initially was plane polarized parallel to one optic axis and hence at right angles to the other optic axis, on the application or non-application of a voltage when passing through the focal length modulator always remains polarized at right angles to and parallel to, respectively, the optic axes, neglecting aberrations.

Since each stage of the focal length modulator includes two birefringent lenses, the curvature of the active refracting surfaces is reduced in comparison to a single lens having the same refractive power as the two lenses together. In addition, the use of a concave lens and a convex lens in each stage provides a thinner lens structure than the use of two lenses having surfaces in which the signs of the curvature are equal. The two aforementioned factors result in that the laws of thin lenses frequently will apply in cases in which they would not sufficiently apply if single birefringent lenses were used.

The lens construction described may be varied in several manners without departing from the scope of the invention. The system shown schematically in FIG. 2 by using plane outer surfaces $p$ and $p'$ of the birefringent lens combination $L_1 \ldots L_N$ ensures that the locations of the foci are independent, in a degree sufficient for most practical uses, of the fluctuations of the refractive index of the medium surrounding the lenses due to temperature variations. It is assumed that within each lens combination two refractive surfaces arranged as close to one another as possible and facing one another show complementary shapes, i.e. have oppositely equal curvatures.

A further property of the arrangement shown in FIG. 2 is that the range of modulation of the angular aperture of the beam S entering the system is always equal in the directions towards smaller and greater values, neglecting slight aberrations. In general, it will not be necessary for all the stages of the focal length modulator to be combinations which each comprise more than one birefringent lens. In the stages to be used for effecting small variations of the angular aperture of the light beam single lenses will be sufficient, as is shown schematically in FIG. 3, only the last lens combination $L_N$ consisting of a concave lens $l_k$ and a convex lens $l_v$.

If a combination comprising two birefringent lenses should not be sufficient to reduce the said aberrations, according to the invention a further improvement is obtainable by the use of a greater number of birefringent elements per stage. FIG. 4 shows an example of a birefringent lens which consists of three lens elements $l_1$, $l_2$ and $l_3$.

In lens combinations according to the invention it is not absolutely necessary to use separate elements the two refracting surfaces of which have equal curvatures. It is also possible to allow a difference in curvature, for example in order to reduce spherical aberration to a minimum, unless this is prevented by other requirements, i.e. constancy of the locations of the foci in the case of temperature variations. Which combinations of curvatures of refracting surfaces are most suitable in a particular case may be decided by means of the known methods of correcting optical systems and according to the laws of double refraction, as has been described, for example by J-Flügge: "Leitfaden der geometrischen Optik und des Optikrechnens," Vandenhoeck und Ruprecht, Göttingen, 1956, and by P. Chmela: "Strahlenverlauf in einem System aus doppelbrechenden Linsen," Optik, 26, 254–263 (1968).

What is claimed is:

1. A digital focal length modulator assembly comprising a plurality of optically aligned modulator stages, each of the stages comprising a controllable electro-optical polarizer and a birefringent lens, the lenses of each successive stage having a progressively increasing effective curvature, the lens having the largest effective curvature comprising at least two confronting birefringent lenses having mutually perpendicular optic axes arranged normal to the principal planes of the lenses, the facing surfaces of the confronting birefringent lenses having opposite curvatures.

2. Apparatus as claimed in claim 1 wherein the non-facing major surfaces of the confronting lenses are planar.

3. Apparatus as claimed in claim 2, wherein the lenses in substantially all of the stages comprise at least two confronting birefringent lenses having mutually perpendicular optic axes arranged normal to the principal planes of the lenses, the facing surfaces of the confronting lenses in each stage having opposite curvatures.

4. Apparatus as claimed in claim 2, wherein the lenses in substantially all of the stages comprise at least two confronting birefringent lenses having mutually perpendicular optic axes arranged normal to the principal planes of the lenses, the facing surfaces of the confronting lenses in each stage having opposite curvatures.

5. Apparatus as claimed in claim 1, wherein the lens comprises a first lens of one type of curvature interposed between a pair of additional lenses of an opposite curvature.

References Cited

UNITED STATES PATENTS 3,410,624 11/1968 Schmidt _____ 350—175(DRL)
3,432,238 3/1969 Girard _____ 350—179X JOHN K. CORBIN, Primary Examiner U.S. Cl. X.R.

350—150, 204, 214